United States Patent
Sayer et al.

(10) Patent No.: US 8,919,385 B2
(45) Date of Patent: Dec. 30, 2014

(54) MANIFOLD PLATES AND FLUID TREATMENT ARRANGEMENTS INCLUDING MANIFOLD PLATES

(75) Inventors: Cheryl A. Sayer, Lowell, MA (US); Cristopher J. Petersen, Amherst, NH (US)

(73) Assignee: Pall Corporation, Port Washington, NY (US)

( * ) Notice: Subject to any disclaimer, the term of this patent is extended or adjusted under 35 U.S.C. 154(b) by 796 days.

(21) Appl. No.: 12/954,118

(22) Filed: Nov. 24, 2010

(65) Prior Publication Data

US 2012/0125456 A1  May 24, 2012

(51) Int. Cl.
- *B01D 63/08* (2006.01)
- *F16L 41/03* (2006.01)
- *B01D 65/00* (2006.01)

(52) U.S. Cl.
CPC ............ *B01D 63/082* (2013.01); *B01D 65/00* (2013.01); *B01D 2313/21* (2013.01)
USPC ... 137/884; 137/545; 137/561 A; 210/321.75; 210/321.84

(58) Field of Classification Search
CPC .... B01D 63/082; F15B 13/0814; F16L 41/03
USPC ......... 137/544, 545, 884, 561 A; 210/321.75, 210/321.84
See application file for complete search history.

(56) References Cited

U.S. PATENT DOCUMENTS

| | | |
|---|---|---|
| 3,907,687 A | 9/1975 | Hoeltzenbein |
| 4,264,447 A | 4/1981 | Nicolet |
| 4,302,270 A | 11/1981 | Nicolet |
| 4,501,663 A | 2/1985 | Merrill |
| 4,517,085 A | 5/1985 | Driscoll et al. |
| 4,715,955 A | 12/1987 | Friedman |
| 4,729,190 A | 3/1988 | Lee |
| 4,735,718 A | 4/1988 | Peters |
| 4,849,102 A | 7/1989 | Latour et al. |
| 4,867,876 A | 9/1989 | Kopf |
| 4,882,050 A | 11/1989 | Kopf |
| 4,891,134 A | 1/1990 | Vcelka |
| 4,956,085 A | 9/1990 | Kopf |
| 5,034,124 A | 7/1991 | Kopf |
| 5,049,268 A | 9/1991 | Kopf |
| 5,057,217 A | 10/1991 | Lutz et al. |
| 5,096,582 A | 3/1992 | Lombardi et al. |
| 5,104,536 A | 4/1992 | Steere et al. |
| 5,147,542 A | 9/1992 | Proulx |

(Continued)

FOREIGN PATENT DOCUMENTS

| | | |
|---|---|---|
| DE | 3441 249 A1 | 5/1985 |
| JP | 2008/218087 A | 9/2008 |

*Primary Examiner* — Atif Chaudry

(74) *Attorney, Agent, or Firm* — Leydig, Voit & Mayer

(57) ABSTRACT

A manifold plate and a filtration arrangement including a manifold plate which comprises a body having a mounting region on the exterior of the body and first and second fluid channels extending within the body. The mounting region has at least one first opening and at least one second opening. At least one first fluid passageway fluidly couples the first opening to the first fluid channel and at least one second passageway fluidly couples the second opening to the second fluid channel. One or more filtration units may be mounted to the mounting region in fluid communication with the first and second openings of the manifold plate.

7 Claims, 4 Drawing Sheets

(56) References Cited

U.S. PATENT DOCUMENTS

| | | | |
|---|---|---|---|
| 5,176,828 | A | 1/1993 | Proulx |
| 5,200,073 | A | 4/1993 | Steere et al. |
| 5,223,133 | A | 6/1993 | Clark et al. |
| 5,232,589 | A | 8/1993 | Kopf |
| 5,259,957 | A | 11/1993 | Rosenfeld et al. |
| 5,342,517 | A | 8/1994 | Kopf |
| 5,354,466 | A | 10/1994 | Yunoki |
| 5,443,723 | A | 8/1995 | Stankowski et al. |
| 5,460,720 | A | 10/1995 | Schneider |
| 5,527,569 | A | 6/1996 | Hobson |
| 5,593,580 | A | 1/1997 | Kopf |
| 5,597,486 | A | 1/1997 | Lutz |
| 5,599,447 | A * | 2/1997 | Pearl et al. ............... 210/321.75 |
| 5,618,419 | A | 4/1997 | Fuerst |
| 5,669,378 | A | 9/1997 | Pera et al. |
| 5,762,789 | A | 6/1998 | des los Reyes et al. |
| 5,788,983 | A | 8/1998 | Chein et al. |
| 5,824,217 | A | 10/1998 | Pearl |
| 5,830,358 | A | 11/1998 | White |
| 5,868,930 | A | 2/1999 | Kopf |
| 5,888,275 | A | 3/1999 | Hamasaki et al. |
| 5,922,200 | A | 7/1999 | Pearl |
| 5,976,380 | A | 11/1999 | Moya |
| 6,000,558 | A | 12/1999 | Proulx |
| 6,017,451 | A | 1/2000 | Kopf |
| 6,022,742 | A | 2/2000 | Kopf |
| 6,027,553 | A | 2/2000 | Hirano et al. |
| 6,030,484 | A | 2/2000 | Maeoka et al. |
| 6,110,249 | A | 8/2000 | Medcalf et al. |
| 6,139,746 | A | 10/2000 | Kopf |
| 6,214,221 | B1 | 4/2001 | Kopf |
| 6,309,605 | B1 | 10/2001 | Zermani |
| 6,368,505 | B1 | 4/2002 | Grummert et al. |
| 6,375,978 | B1 | 4/2002 | Kleiner et al. |
| 6,383,380 | B1 | 5/2002 | Kopf |
| 6,406,623 | B2 | 6/2002 | Petersen et al. |
| 6,764,653 | B2 | 7/2004 | Zermani |
| 7,806,143 | B2 * | 10/2010 | Taskar .......................... 137/884 |
| 8,307,854 | B1 * | 11/2012 | Vu ................. 137/884 |
| 2002/0108898 | A1 | 8/2002 | Zermani |
| 2004/0063169 | A1 | 4/2004 | Kane |
| 2006/0060518 | A1 * | 3/2006 | Perreault .................... 210/321.6 |
| 2008/0135500 | A1 | 6/2008 | Gagnon et al. |

* cited by examiner

MANIFOLD PLATES AND FLUID TREATMENT ARRANGEMENTS INCLUDING MANIFOLD PLATES

DISCLOSURE OF THE INVENTION

The invention relates to manifold plates and fluid treatment arrangements which include manifold plates. A fluid treatment arrangement may include at least one manifold plate and one or more fluid treatment units mounted to a mounting region of the manifold plate. Each fluid treatment unit may include a fluid treatment medium that may be used to treat a fluid. The fluid may be a gas, a liquid, or a mixture of gases, liquids, and/or solids, and the fluid treatment medium may treat the fluid in any of a wide variety of ways. For example, the fluid treatment medium may be a filtration medium which prevents substances in the fluid, e.g., particulates or macromolecules above a certain size, from passing through the filtration medium. As another example, the fluid treatment medium may be a capture medium which chemically and/or physically binds to substances in the fluid, e.g., ions, molecules, or macromolecules, including proteins or nucleic acids. The manifold plate may supply fluid to the fluid treatment media of the fluid treatment units and/or may receive fluid from the fluid treatment units.

A manifold plate may include a body having a length which extends in the x direction, a width which extends in the y direction, and a thickness which extends in the z direction of a standard x, y, z rectangular coordinate system. The manifold body may also have an exterior and a mounting region in an x, y plane on the exterior of the body. The mounting region may include at least one first opening and at least one second opening, and the first and second openings are fluidly isolated from one another. The manifold plate may further include a first fluid channel, a second fluid channel, at least one first fluid passageway, and at least one second fluid passageway. The first and second fluid channels may extend along the body spaced from the mounting region, and each channel may have a port that opens onto the exterior of the body away from the mounting region. Further, the first and second channels may be in close proximity to, and are fluidly isolated from, one another. The first fluid passageway extends from the first opening in the mounting region to the first channel in the body, and the second fluid passageway extends from the second opening in the mounting region to the second channel in the body. Each passageway is defined by a wall, and at least a portion of the wall may extend at an angle less than 90° to the mounting region. Further, a projection parallel to the z direction from every point on the wall of each passageway may intersect the corresponding opening in the mounting region without passing through the wall. The manifold plate may supply fluid to the fluid treatment units via the first channel, passageway(s), and opening(s) and/or via the second channel, passageway(s), and opening(s). Alternatively or additionally, the manifold plate may receive fluid from the fluid treatment units via the first channel, passageway(s), and opening(s) and/or via the second channel, passageway(s), and opening(s).

Embodiments of the invention have many advantages. For example, sterility and/or a low bioburden are highly important in many industries, including the pharmaceutical industry and the biotechnology industry. Manifold plates and fluid treatment arrangements including manifold plates embodying the invention are well suited for these industries. Because the walls of the fluid passageways have direct line-of-sight projections to the openings in the mounting region, both the exterior of the body, including the mounting region, and the passageway walls can be easily and effectively sterilized using a non-penetrating, sterilizing radiation such as a UV radiation. Further, the cleanliness of the mounting region and the passageway walls can be reliably verified by visual inspection. Other advantages include ease of manufacture. Since all points on the walls of the passageways have direct projections to the openings, the manifold plate can be reliably and inexpensively manufactured using a straight-pull injection molding technique. Straight-pull injection molding is a fast, effective manufacturing technique that allows the mounting region, all of the openings in the mounting region, and all of the fluid passageways to be formed in one simple step of pulling two halves of an injection mold apart.

DESCRIPTION OF EMBODIMENTS OF THE INVENTION

Figure 1:
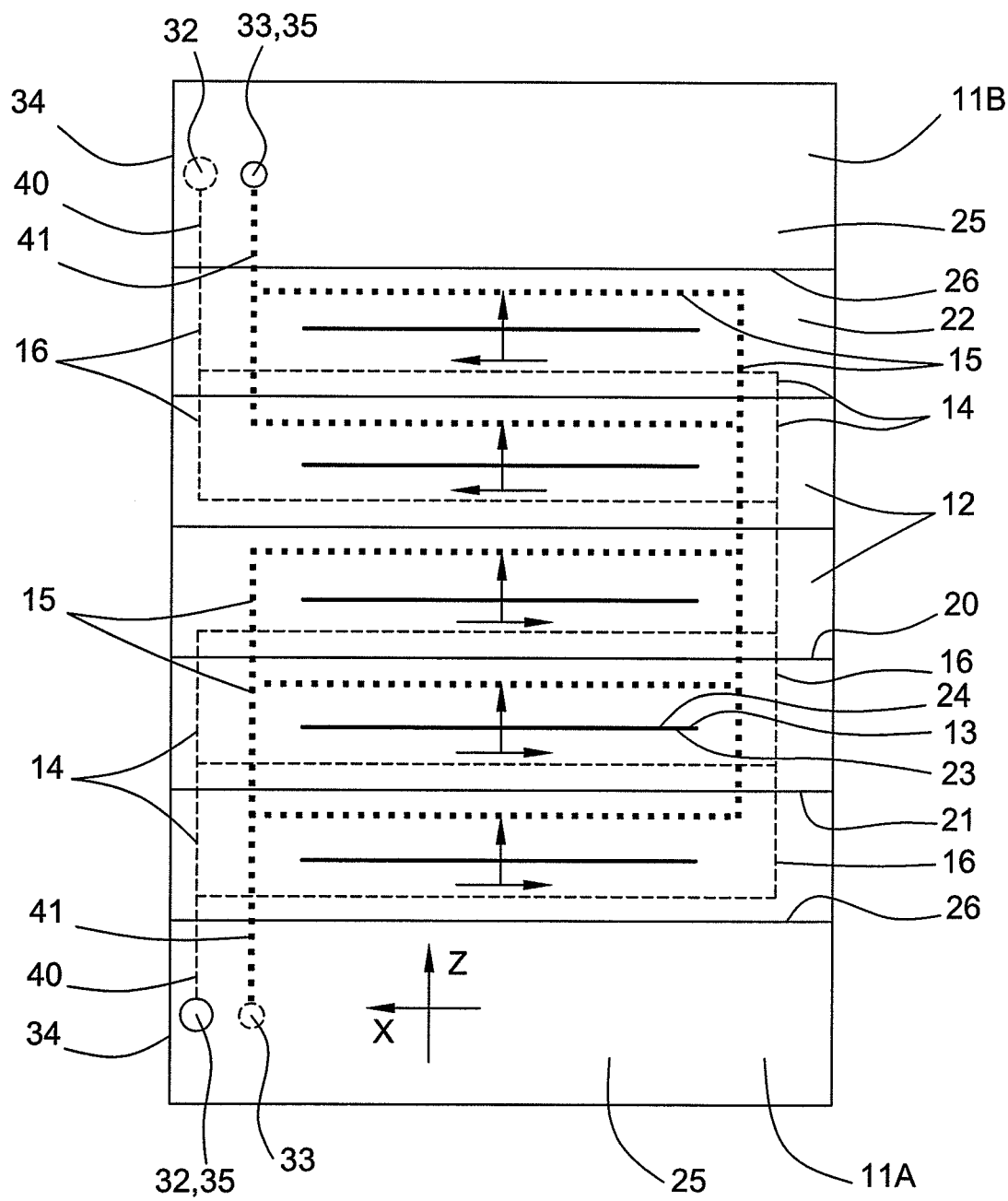
FIG. 1 is a representative view of a fluid treatment arrangement.

Fluid treatment arrangements embodying one or more aspects of the invention may be configured in a wide variety of ways. One of many different examples of a fluid treatment arrangement 10 is represented in FIG. 1. Generally, a fluid treatment arrangement may comprise at least one manifold plate and one or more fluid treatment units mounted to the manifold plate. In the illustrated embodiment, the fluid treatment arrangement 10 includes first and second manifold plates 11A, 11B and a plurality of fluid treatment units 12 stacked between the manifold plates 11A, 11B. The manifold plates 11A, 11B may supply fluid to and/or receive fluid from the fluid treatment units 12, while a fluid treatment medium 13 in each fluid treatment unit 12 may treat the fluid.

The fluid treatment arrangement may be assembled in any of numerous ways, including, for example, as disclosed in United States Patent Application Publication Nos. US 2008/0135468 A1, US 2008/0135499 A1, and US 2008/0135500 A1, all of which are incorporated by reference. For example, the fluid treatment arrangement may further include seals, including gaskets, between the fluid treatment units or between a fluid treatment unit and a manifold plate, alignment rods for maintaining the fluid treatment unit(s) and manifold plate(s) properly aligned within the fluid treatment arrangement, and/or compression rods for compressing the fluid treatment unit(s) and the manifold plate(s) against one another. Alternatively, the fluid treatment unit(s) and the manifold plate(s) may be compressively held within a mechanical and/or hydraulic holder or press.

The fluid treatment arrangement may be arranged for dead-end flow or for tangential flow. In dead-end flow, process or feed fluid is supplied to at least one manifold plate, which then directs the fluid to the fluid treatment media of the fluid treatment units. The fluid treatment units may be arranged to fluidly communicate with one another in a variety of ways, including a serial, parallel, or combined serial/parallel manner. For dead-end flow, all of the feed fluid passes through one or more of the fluid treatment media as permeate or filtrate. The filtrate is then directed from the fluid treatment units to one or more manifold plates.

The fluid treatment arrangement 10 represented in FIG. 1 is arranged for tangential flow. Process or feed fluid is supplied to at least one manifold plate 11A, which directs the feed fluid via feed passages 14 to the fluid treatment media 13 of the fluid treatment units 12. Again, the fluid treatment units may be arranged to fluidly communicate with one another in a variety of ways, including a serial, parallel, or combined serial/parallel manner. For tangential flow, the feed fluid passes tangentially along the fluid treatment medium 13 of each fluid treatment unit 12, and a portion of the feed fluid passes through each fluid treatment medium 13 as permeate or filtrate into a permeate passage 15. The feed fluid which does not pass through the fluid treatment medium 13 passes as concentrate or retentate into retentate passages 16 that fluidly communicate directly with the feed passages 14. Via the permeate and retentate passages 15, 16, the filtrate and the retentate are then separately passed to one or more manifold plates 11A, 11B, from which the filtrate and the retentate are separately discharged.

Each fluid treatment unit 12 may have any of numerous sizes and shapes and may be configured in a variety of ways. For example, a fluid treatment unit 12 may have a length extending in an x direction, a width extending in a y direction, and a thickness extending in a z direction of a standard x, y, z rectangular coordinate system. Oppositely facing outer surfaces 20, 21 of the fluid treatment unit 12 may extend in an x, y plane on the exterior of the fluid treatment unit 12. The fluid treatment units 12 may be stacked to one another along the outer surfaces 20, 21, with or without intervening structures, such as seals.

Each fluid treatment unit may have a multi-piece or single piece construction. For example, each fluid treatment unit may be composed of a separate fluid treatment medium layer overlayed on or between one or more drainage layers, e.g., mesh layers. As another example, the fluid treatment unit may be constructed as an integral fluid treatment cassette. In FIG. 1, each fluid treatment unit 12 may include a fluid treatment medium 13 sealed within a casing 22 to define a feed side 23 and a permeate side 24 of the fluid treatment medium 13. One or more feed passages 14 may extend within the casing 22 to and tangentially along the feed side 23 of the fluid treatment medium 13. One or more retentate passages 16 may extend within the casing 22 from the feed side 23 of the fluid treatment medium 13 in fluid communication with the feed passages 14. One or more permeate passages 15 may extend within the casing 22 along and from the permeate side 24 of the fluid treatment medium 13. Although the permeate passages 15 may fluidly communicate with the feed/retentate passages 14, 16 through the fluid treatment medium 13, the permeate passages 15 may otherwise be fluidly isolated from the feed and retentate passages 14, 16. The feed, permeate, and retentate passages 14, 15, 16 may include openings on one or both surfaces 20, 21 of each fluid treatment unit 12 which enable passages 14, 15, 16 in one fluid treatment unit 12 to fluidly communicate with passages of an adjacent fluid treatment unit 12 or a manifold plate 11A, 11B. Depending on the flow arrangement of the fluid treatment units, one or more of the openings in the passages may be blocked off, for example, by sealing off one or more openings on at least one outer surface of the fluid treatment unit.

The fluid treatment medium may be porous, permeable, semipermeable, or permselective and may be formed from any of numerous materials, including, for example, a natural or synthetic polymer. The fluid treatment medium may be fashioned as any of a wide variety of structures, including, for example, a fibrous or filamentous structure, such as a woven or non-woven sheet, or a membrane, such as a supported or unsupported membrane. Further, the fluid treatment medium may have, or may be modified to have, any of a myriad of fluid treatment characteristics. For example, the fluid treatment medium may have a positive, negative, or neutral electrical charge; it may be liquiphobic or liquiphilic, including hydrophobic or hydrophilic or oleophobic or oleophilic; and/or it may have attached functional groups, such as ligands or any other reactive moiety, that can chemically bind to substances in the fluid. The fluid treatment medium may be formed from, impregnated with, or otherwise contain a variety of materials that function to further treat the fluid in any of numerous ways. These functional materials may include, for example, sorbents, ion exchange resins, chromatography media, enzymes, reactants, or catalysts of all types that may chemically and/or physically bind, react with, catalyze, deliver, or otherwise affect substances in the fluid or the fluid itself. Further, the fluid treatment medium may have any of a wide range of molecular cutoffs or removal ratings, for example, from ultraporous or nanoporous or finer to microporous or coarser. The fluid treatment medium may thus function as a treatment medium of any type, including a capture medium or a filtration medium.

Figure 2:
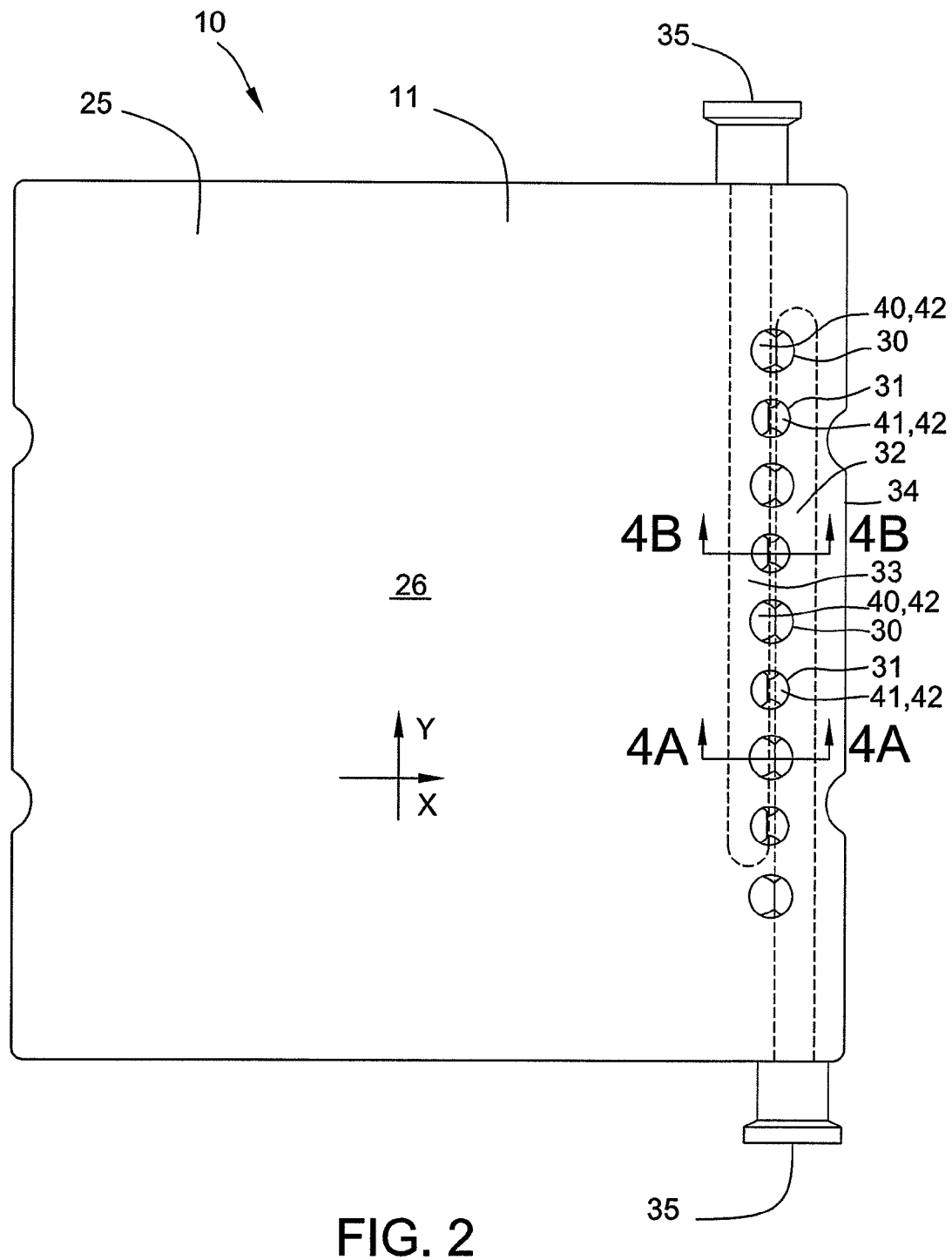
FIG. 2 is a top view of a manifold plate of the fluid treatment arrangement of FIG. 1.
Figure 3:
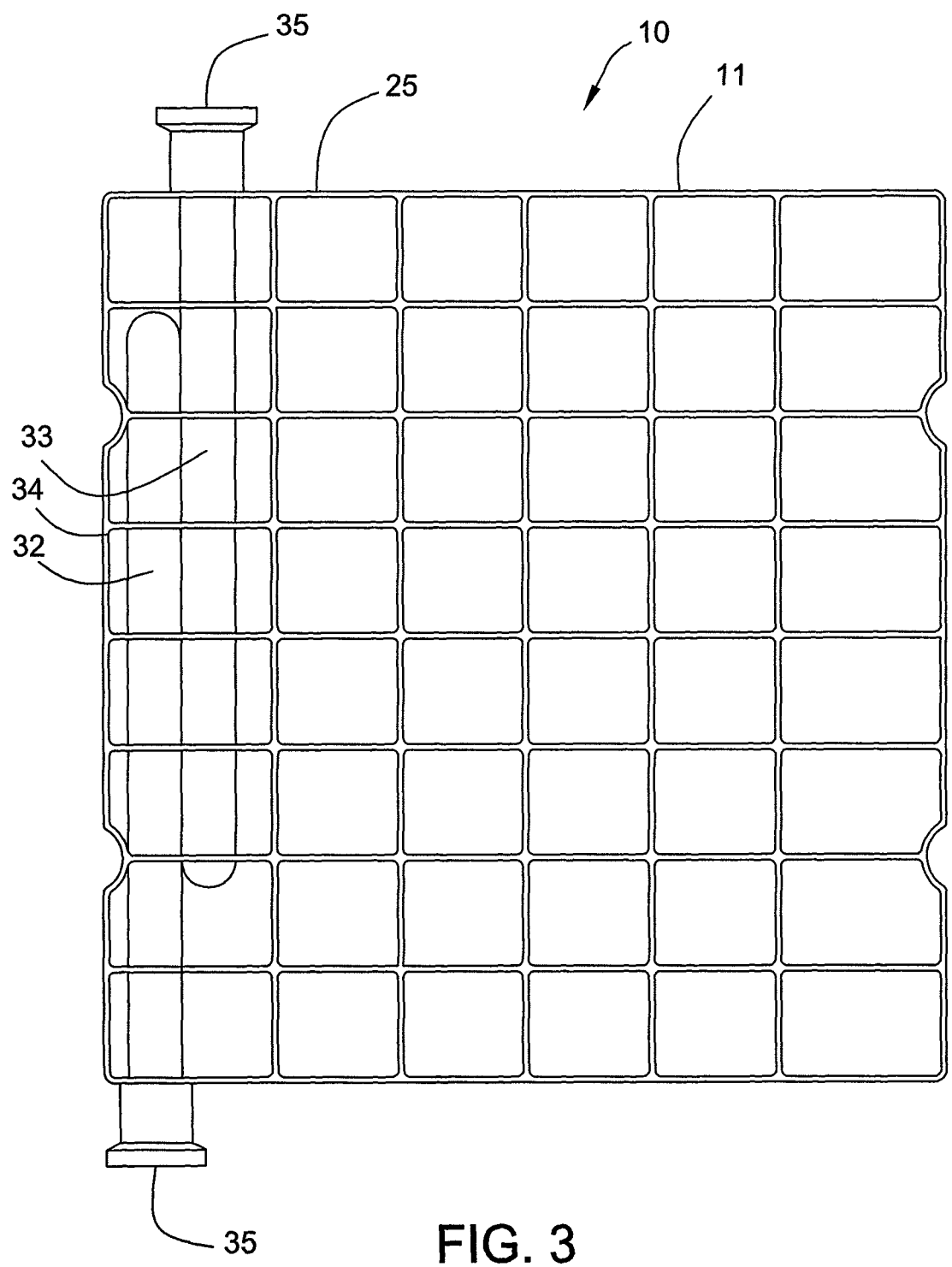
FIG. 3 is a bottom view of the manifold plate of FIG. 2.

The manifold plate may be configured in a variety of different ways. For example, as shown in FIGS. 2 and 3, the manifold plate 11 may comprise a body 25, and the body 25 may have any of numerous configurations. For example, the body 25 may have a length which extends in an x direction, a width which extends in a y direction, and a thickness which extends in a z direction of a standard x, y, z rectangular coordinate system. The interior of the body may be generally solid or hollow or it may have another structure, including the lattice structure shown, for example, in FIG. 3. The exterior of the body 25 may include an exterior surface in an x, y plane on at least one side of the manifold plate 11. All, or a portion, of the outer surface may comprise a mounting region 26, and the fluid treatment units 12 may be mounted to the manifold plate 11 at the mounting region 26. The mounting region 26 may be generally flat and may include one or more first openings 30 and one or more second openings 31. The first and second openings 30, 31 may have any regular or irregular shape. Further, the first and second openings 30, 31 in the mounting region 26 are fluidly isolated from one another and may be aligned with or offset from one another.

The manifold plate 11 may also include at least first and second fluid channels 32, 33 that extend along the body 25 fluidly isolated from one another. The fluid channels may be straight, curved, or tortuous; may or may not be tapered; and may have any of a variety of cross sectional shapes, including circular and elliptical. For many embodiments, the body 25 may have a side edge 34, and the first and second fluid channels 32, 33 may extend straight within the body 25 along the y direction near the side edge 34. Further, the first and second fluid channels 32, 33 may extend alongside one another, e.g., parallel to one another, and may be in close proximity to one another, e.g., 3 inches (7.5 cm) or less apart, or 2 inches (5 cm) or less apart, or 1 inch (2.5 cm) or less apart. Each of the first and second channels 32, 33 may terminate in a port 35 that opens onto the exterior of the body 25 away from the mounting region 26. Each port 35 may be configured in any of numerous ways. For example, each port 35 may be configured as a fitting, e.g., a flanged portion of a TriClover fitting.

Figure 4A:
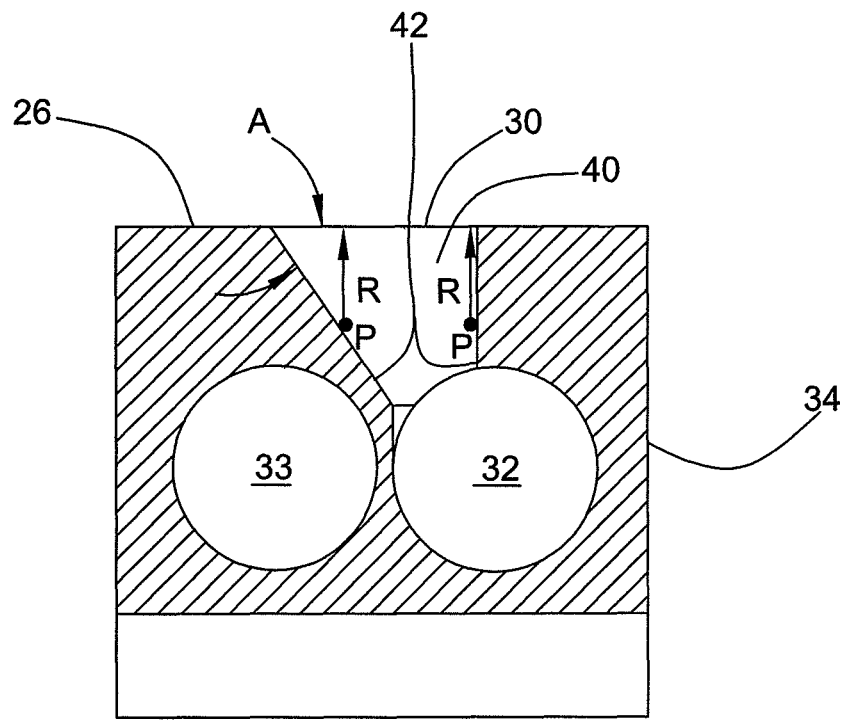
FIG. 4a is a cross-sectional view of the manifold plate of FIGS. 2 and 3 showing fluid passageways in the manifold plate.
Figure 4B:
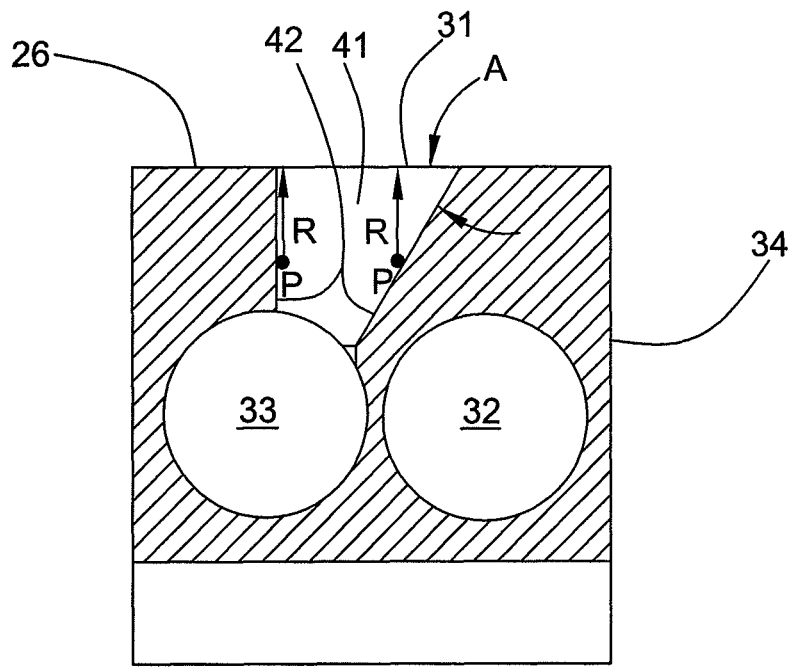
FIG. 4b is a cross-sectional view of the manifold plate of FIGS. 2 and 3 showing additional fluid passageways in the manifold plate.

The manifold plate 11 may further include at least one first fluid passageway 40 which extends between a first opening 30 in the mounting region 26 and the first fluid channel 32 in the body 25. The first fluid passageway may open into the first fluid channel 32 at a first aperture 38 and the first aperture 38 may be smaller than the first opening 30. The manifold plate 11 may also include at least one second fluid passageway 41 which extends between a second opening 31 in the mounting region 26 and the second fluid channel 33 in the body 25. The second fluid passageway 41 may open into the second fluid channel 33 at a second aperture 39, and the second aperture 39 may be smaller than the second opening 31. The manifold plate 11 shown in FIG. 2 has a plurality of first openings 30 and first fluid passageways 40 and a plurality of second openings 31 and second fluid passageways 41. The first and second openings 30, 31 may be distributed along, e.g., may alternate along, the mounting region 26 generally parallel to the first and second fluid channels 32, 33. The first and second fluid passageways 40, 41 are fluidly isolated from one another, each first fluid passageway 40 being fluidly coupled and fluidly communicating directly between one first opening 30 and the first fluid channel 32 and each second fluid passageway 41 being fluidly coupled and fluidly communicating directly between one second opening 31 and the second fluid channel 33. Each fluid passageway 40, 41 may be regularly or irregularly shaped; may be straight or curved; and may be defined by a wall 42. One of many different examples of a wall 42 is shown in FIGS. 4A and 4B. At least a portion of the wall 42 of each first and second fluid passageway 40, 41 may extend at an angle A to the mounting region 26 at the corresponding opening 30, 31, and the angle A may be less than 90°. The angle may be measured, as shown in FIGS. 4A and 4B, from the surface of the mounting region 26 to the surface of the wall 42. Further, the wall 42 may be structured such that from every point P on the wall 42 a projection R parallel to the z direction intersects the corresponding opening 30, 31 in the mounting region 26 without passing through the wall 42. For example, from points P on an angled portion of the wall 42, the projections R may extend away from the wall 42 to the corresponding opening 30, 31 without passing through the wall 42. From points P on any portion of the wall 42 that extends 90° to the mounting region 26, the projections R may extend parallel to the wall 42 to the corresponding opening 30, 31 without passing through the wall 42.

The manifold plate may be formed from a metal, including stainless steel; a thermoplastic, including a polyolefin, such as polypropylene; or a thermoset. Further, the manifold plate may be made by one or more of several manufacturing techniques, including machining, casting and molding. For example, the manifold plate 11 shown in FIGS. 2 and 3 may be formed from polypropylene by a straight-pull injection molding technique.

The fluid treatment units 12 may be mounted to the mounting region 26 of a manifold plate 11 with the first and second openings 30, 31 in the mounting region 26 fluidly communicating with the passage openings in the outer surface 20, 21 of an adjacent fluid treatment unit 12. The manifold plate 11 may then supply fluid to and/or receive fluid from the fluid treatment units 12. Either or both of the first fluid channel, fluid passageway(s), and opening(s) and the second fluid channel, fluid passageway(s), and opening(s) may be associated with the process or feed fluid, the filtrate or permeate, or the retentate or concentrate. For example, in the fluid treatment arrangement 10 of FIG. 1, the port 35 of either fluid channel, e.g., the first fluid channel 32, of one manifold plate, e.g., the first manifold plate 11A, may be a feed or process fluid inlet port, while the port 35 of the second fluid channel 33 may be a filtrate or permeate outlet port. Similarly, the port 35 of either fluid channel, e.g., the first fluid channel 32, of the second manifold plate 11B may be a retentate or concentrate outlet port, while the port 35 of the second fluid channel 33 may be a filtrate or permeate outlet port.

Feed fluid may then be supplied to the feed inlet port 35 of the first manifold plate 11A, and the first fluid channel 32 may serve as a feed channel 32 directing feed fluid to the feed passages 14 of the fluid treatment units 12 via the first fluid passageways 40 and the first openings 30 in the first manifold plate 11A. The feed fluid may pass along the feed passages 14 in the fluid treatment units 12 to the fluid treatment media 13, where the feed fluid passes tangentially along the feed side 23 of the fluid treatment medium 13. The feed fluid that does not pass through the fluid treatment media 13 may pass as retentate or concentrate along the retentate passages 16 in the fluid treatment units 12 to the first openings 30 in the second manifold plate 11B. The first fluid channel 32 in the second manifold plate 11B may then serve as a retentate channel, receiving retentate or concentrate via the first openings 30 and the first fluid passageways 40 and discharging the retentate or concentrate via the retentate port 35. The portion of the feed fluid which passes through the fluid treatment media 13 as filtrate or permeate may be treated in accordance with the treatment characteristics of the fluid treatment media 13 and may then be directed along the permeate passages 15 in the fluid treatment units 12 to the second openings 31 in both manifold plates 11A, 11B. The second fluid channel 33 in each manifold plate 11A, 11B may then serve as a permeate channel, receiving filtrate or permeate via the second openings 31 and the second fluid passageways 41 and discharging the filtrate or permeate via the permeate discharge port 35.

Many advantages are associated with manifold plates and fluid treatment arrangements including manifold plates embodying one or more aspects of the invention. For example, the walls of the first and second fluid passageways have direct line-of-sight projections to the openings in the mounting region. Consequently, both the exterior of the manifold plate, including the mounting region, and the walls of the first and second fluid passageways can be easily and effectively sterilized using a non-penetrating, sterilizing radiation such as UV radiation. Further, the cleanliness of the mounting region and the passageway walls can be easily and reliably verified by visual inspection. Another advantage includes ease of manufacture. All points on the passageway walls have direct projections to the corresponding openings. Consequently, the manifold plate can be reliably and inexpensively manufactured using a straight-pull injection molding technique. The mounting region, all of the fluid openings in the mounting region, and all of the fluid passageways may be precisely formed in one simple step of pulling the two halves of an injection mold in one direction, e.g., normal to the outer surface of the manifold plate. This significantly reduces the number of costly side actions associated with molding the manifold plate.

While various aspects of the invention have been described and/or illustrated with respect to several embodiments, the invention is not limited to these embodiments. For instance, one or more features of these embodiments may be eliminated or modified or one or more features of one embodiment may be combined with one or more features of other embodiments, without departing from the scope of the invention. Even embodiments with very different features may be within the scope of the invention.

For example, the embodiment of FIGS. 2 and 3 may be modified to provide third and fourth fluid channels in the body which are similar to the first and second fluid channels but are located, for example, along an opposite side edge of the body. One or more third openings and one or more fourth openings, similar to the first and second openings, may be provided in the mounting region near the third and fourth fluid channels. Further, each third opening may be connected to the third fluid channel and each fourth opening may be connected to the fourth fluid channel by third and fourth fluid passageways, respectively, similar to the first and second fluid passageways. A manifold plate having four fluid channels may be the only manifold plate in a fluid treatment arrangement, supplying all of the feed fluid to the fluid treatment units as well as receiving all retentate and permeate from the fluid treatment units.

As another example, the embodiment of FIGS. 2 and 3 may be modified to provide a second mounting region in an outer surface on the opposite side of the body of the manifold plate. One or more first openings and one or more second openings may be provided in the second mounting region. Each first opening in the second mounting region may be fluidly coupled to the first fluid channel by a first fluid passageway. Each second opening in the second mounting region may be fluidly coupled to the second fluid channel by a second fluid passageway. The first and second fluid passageways coupling the first and second openings in the second mounting region to the first and second fluid channels may be similar to the first and second fluid passageways coupling the first and second openings in the first mounting region to the first and second fluid channels. A manifold plate having mounting surfaces on opposite sides may allow bidirectional flow of feed, retentate, and/or permeate to and/or from fluid treatment units on both sides of the manifold plate.

The present invention is thus not restricted to the particular embodiments which have been described and/or illustrated herein but includes all embodiments and modifications that may fall within the scope of the invention as defined by the claims.

The invention claimed is:

1. A manifold plate comprising:
a body having an exterior and a length, width, and thickness extending along x, y, and z directions, respectively, of a standard x, y, z coordinate system, wherein the exterior of the body includes an outwardly facing mounting region against which one or more fluid treatment units can be mounted, the mounting region generally lying in an x, y plane of the body, wherein the mounting region includes at least one first opening and at least one second opening arranged to fluidly communicate with fluid treatment units that can be mounted to the body, the first and second openings being fluidly isolated from one another;

first and second fluid channels extending along the body spaced from the mounting region, wherein the first and second fluid channels are in close proximity to and fluidly isolated from one another and wherein each fluid channel has an outer surface that extends parallel to the mounting region and includes a port which opens onto the exterior of the body away from the mounting region; and at least one first passageway extending from the first opening to the first channel and at least one second passageway extending from the second opening to the second channel, wherein each passageway is defined by a wall and at least a portion of the wall extends at an angle less than 90° to die mounting region and wherein a projection parallel to the z direction from every point on the wall of each passageway intersects the corresponding opening in the mounting region without passing through the wall, such that the portion of the wall that extends at an angle less than 90° to the mounting region extends to the outer surface of the first channel or second channel.

2. The manifold plate of claim 1 wherein each of the first and second fluid channels extends generally straight within the body.

3. The manifold plate of claim 1 wherein the first and second channels extend generally parallel to and alongside one another within the body.

4. The manifold plate of claim 1 including a plurality of first openings and a plurality of second openings in the mounting region and a plurality of first passageways and a plurality of second passageways, each first passageway fluidly connecting a first opening to the first channel and each second passageway fluidly connecting a second passageway to the second channel.

5. The manifold plate of claim 4 wherein the first openings are offset from the second openings.

6. The manifold plate of claim 4 wherein the first openings are aligned with the second openings.

7. A fluid treatment arrangement comprising a manifold plate of claim 1 and one or more fluid treatment units mounted to the mounting region of the manifold plate, wherein:
the one or more fluid treatment units are arranged to fluidly communicate with the first and second openings in the manifold plate.

* * * * *